Patented Dec. 25, 1923.

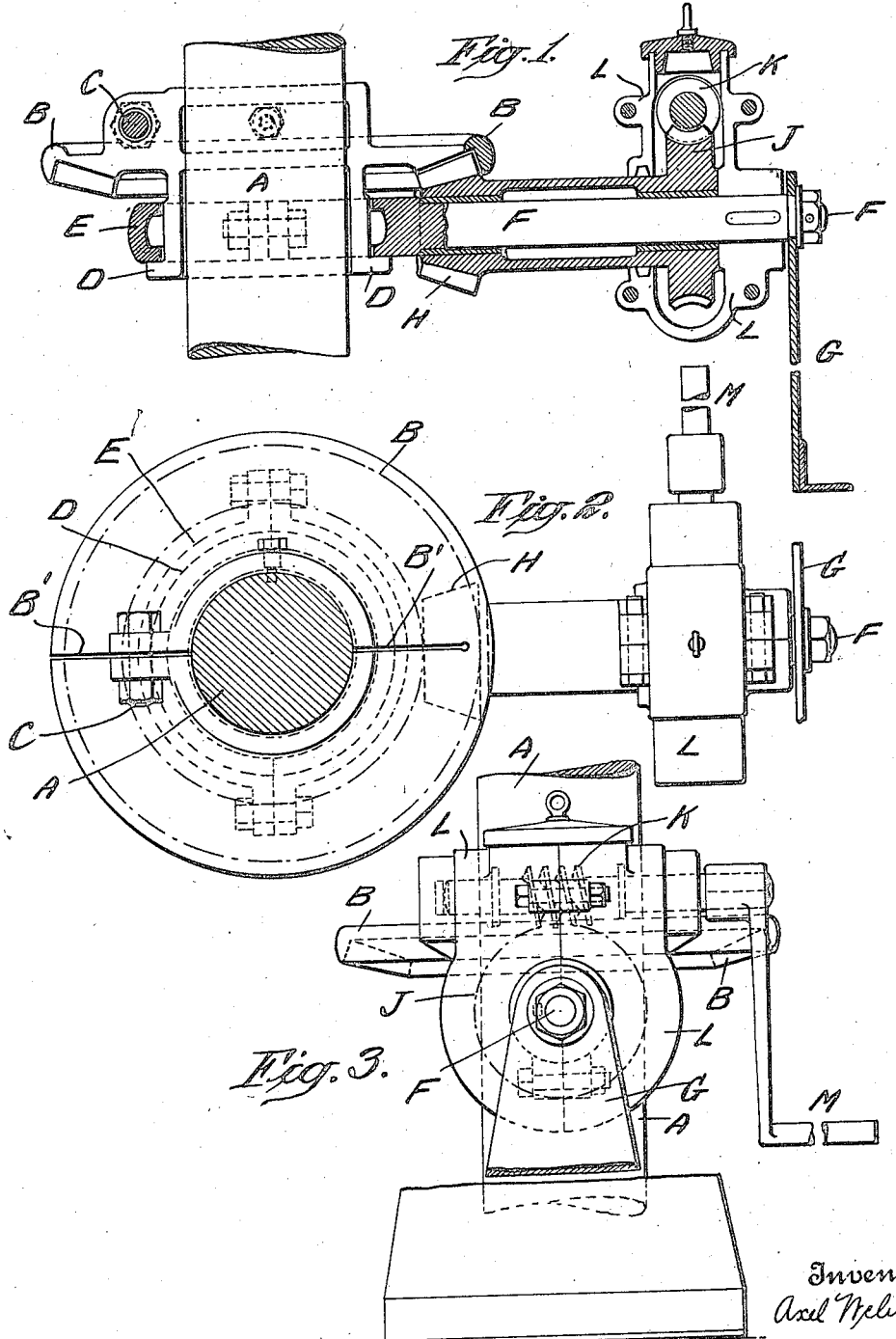

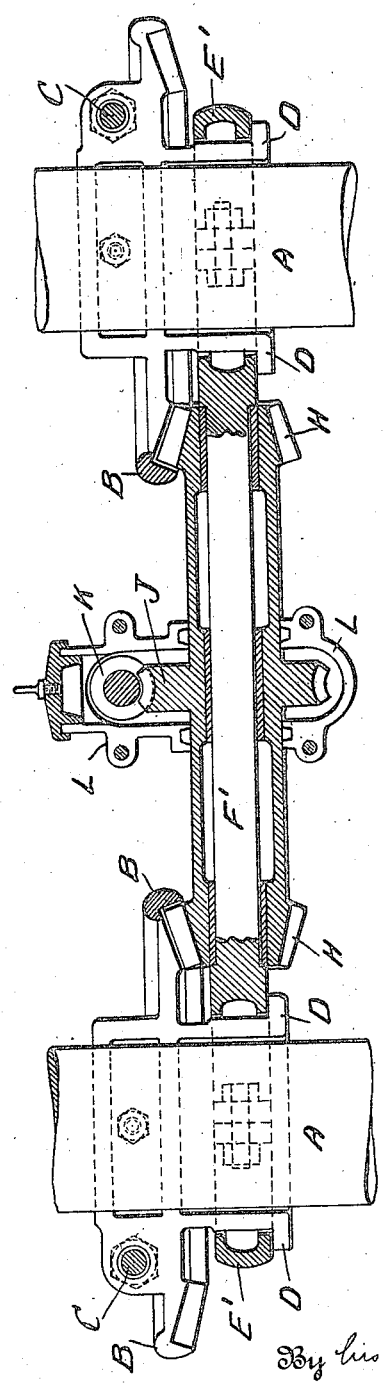

1,478,994

UNITED STATES PATENT OFFICE.

AXEL WELIN, OF LONDON, ENGLAND, ASSIGNOR TO AMERICAN BALSA COMPANY, INC., A CORPORATION OF NEW YORK.

MECHANISM FOR TURNING SHIPS' DAVITS.

Application filed May 23, 1923. Serial No. 640,876.

*To all whom it may concern:*

Be it known that I, AXEL WELIN, a subject of the King of Sweden, and a resident of London, E. C., England, have invented certain new and useful Improvements in Mechanism for Turning Ships' Davits, of which the following is a specification.

This invention relates to improvements in mechanism for turning ships' davits.

The objects of this invention are to produce a gear mechanism for turning out round-bar davits which will be extremely simple in construction and efficient in operation; which will be composed of relatively few parts; which may be manufactured at a comparatively low cost; which will be strong, compact and durable and will occupy a minimum of deck space; which may be mounted upon a horizontal rod having one end connected to a loose collar supported on the davit arm and the other end supported or steadied by a plate or bracket on the deck of a vessel, or connected to another loose collar supported on an adjacent davit arm, and which gear preferably comprises a worm, a worm wheel and a bevel pinion preferably formed integrally and rotatable on said horizontal rod and which bevel-pinion meshes with a bevel wheel fast on the davit arm and preferably formed integrally with a supporting flange for the loose collar.

When two pairs of davits are provided close to one another the horizontal rod may extend from the after davit of one pair to the forward davit of the pair behind, or the outer end of the rod may be supported by a plate or bracket secured to the deck.

The invention is illustrated by the accompanying drawing, Figure 1 of which is a vertical section of a gear embodying my invention; Figure 2 a plan; Figure 3 an elevation and Figure 4 a vertical section similar to Figure 1 showing the use of my improved gear applied to two adjacent davit arms.

On the davit A is threaded a bevel wheel B which is split along a radius B¹ so as to admit of its being readily placed in position after which it can be clamped on the davit by a bolt C. Depending from the wheel B is a flange D which supports a collar E from which extends a horizontal rod F, the outer end of which is steadied so that the rod cannot turn around the davit by a plate G fastened to the deck. On the rod are threaded a bevel pinion H and worm wheel J made in one piece, the pinion H meshing with the wheel B while the wheel J meshes with a worm K contained in a casing L which is made in two halves bolted together and which is keyed to the rod F so that it cannot turn. The worm K is turned by a handle M.

In Figure 4 I have shown a construction in which a horizontal rod F' extends from the after davit of one pair of davits to the forward davit of an adjacent pair of davits, and is connected at its opposite ends to loose collars E' supported on said davit arms. In other respects the construction is similar to that hereinabove described.

Having described my invention, I claim:—

1. Mechanism for turning ships' davits embodying, in combination, a davit arm, a loose collar supported on said davit arm, a gear wheel fast on said davit arm, a horizontal rod connected at one end to said loose collar and extending radially of said gear wheel; means for supporting the other end of said horizontal rod; a pinion supported on said rod and meshing with said gear wheel, and means for rotating said pinion.

2. Mechanism for turning ships' davits embodying, in combination, a davit arm, a loose collar supported on said davit arm, a horizontal rod connected at one end to said loose collar, means for supporting the other end of said rod, a bevel gear fast on said davit arm, a bevel pinion rotatable on said rod meshing with said bevel wheel on the davit arm and means also mounted on said rod for rotating the said pinion.

3. Mechanism for turning ships' davits embodying, in combination, two davit arms comprising adjacent members of two pairs of davit arms, a loose collar supported on each of said davit arms, a horizontal rod connected to said loose collars at opposite ends and supported thereby, a gear wheel fast on each of said davit arms and mechanism mounted on said rod and engaging said gear wheels for turning said davits.

4. Mechanism for turning ships' davits embodying, in combination, a davit arm, a gear wheel fast on said davit arm, a supporting flange integral with said gear wheel, a loose collar supported on said supporting flange, a horizontal rod having one end connected to said loose collar; means for supporting the other end of said rod, a worm wheel and pinion formed in one piece and rotatable on said rod and a worm supported on said rod for rotating said worm wheel and pinion.

5. The combination with a davit arm of a bevel wheel fast thereon, a collar supported by and loose on the wheel, a rod which is supported by the collar and on which can turn a bevel pinion meshing with the bevel wheel and means for rotating the pinion, substantially as described.

6. The combination with a davit arm of a bevel wheel fast on the arm, a collar loose on the arm, a rod supported by the collar and by a plate or bracket secured the deck, a pinion rotatable on the rod and meshing with the bevel wheel and means carried by the rod for rotating the pinion.

7. The combination of two davit arms, a bevel wheel fast on each arm, a collar loose on each arm, a rod supported by the two collars, bevel pinions rotatable on the rod and meshing with the bevel wheels and means carried by the rod for rotating the pinions.

In witness whereof, I have signed my name to the foregoing specification in the presence of two subscribing witnesses.

AXEL WELIN.

Witnesses:
   RUSSELL H. RHODES,
   ALFRED L. PANOT.